United States Patent
Motoike et al.

(10) Patent No.: US 7,239,033 B2
(45) Date of Patent: Jul. 3, 2007

(54) DRIVE APPARATUS FOR HYBRID VEHICLE

(75) Inventors: Kazutoshi Motoike, Susono (JP);
Yutaka Taga, Aichi-gun (JP);
Masahiro Kojima, Susono (JP);
Masatoshi Adachi, Susono (JP); Jiro Kaneko, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 10/498,828

(22) PCT Filed: Dec. 23, 2002

(86) PCT No.: PCT/IB02/05582

§ 371 (c)(1),
(2), (4) Date: Oct. 7, 2004

(87) PCT Pub. No.: WO03/055709

PCT Pub. Date: Jul. 10, 2003

(65) Prior Publication Data

US 2005/0037883 A1 Feb. 17, 2005

(30) Foreign Application Priority Data

Dec. 26, 2001 (JP) ............................ 2001-394459
Dec. 26, 2001 (JP) ............................ 2001-394460

(51) Int. Cl.
*B60K 5/00* (2006.01)

(52) U.S. Cl. .................................. 290/40 C

(58) Field of Classification Search ............... 290/40 C
See application file for complete search history.

(56) References Cited

U.S. PATENT DOCUMENTS

| 3,732,751 | A | 5/1973 | Berman et al. |
|---|---|---|---|
| 5,904,631 | A * | 5/1999 | Morisawa et al. ............. 475/5 |
| 5,917,248 | A | 6/1999 | Seguchi et al. |
| 6,371,878 | B1 | 4/2002 | Bowen |
| 2002/0094898 | A1 | 7/2002 | Hata |
| 2004/0011576 | A1 * | 1/2004 | Taniguchi et al. ......... 180/65.2 |
| 2004/0084233 | A1 * | 5/2004 | Wakuta et al. ............. 180/65.2 |

FOREIGN PATENT DOCUMENTS

| DE | 28 23 225 | 11/1979 |
|---|---|---|
| DE | 197 39 906 | 3/1999 |

(Continued)

*Primary Examiner*—Joseph Waks
(74) *Attorney, Agent, or Firm*—Oblon, Spivak, McClelland, Maier & Neustadt, P.C.

(57) ABSTRACT

A drive apparatus for a hybrid vehicle is provided with a first motor generator, a power splitting mechanism portion, and a second motor generator. The first motor generator functions mainly as a generator. The power splitting mechanism portion divides the power generated by the engine into power for the first motor generator and power for driven wheels. The second motor generator has an outside diameter that is smaller than the outside diameter of the first motor generator and is arranged on the side of the first motor generator opposite the engine. Further, a speed reducing mechanism portion which has an outside diameter smaller than the outside diameter of the second motor generator and which reduces the rotation speed of the second motor generator is provided on the side of the second motor generator opposite the engine.

3 Claims, 6 Drawing Sheets

FOREIGN PATENT DOCUMENTS

| | | |
|---|---|---|
| DE | 198 03 160 | 5/1999 |
| EP | 769 403 | 4/1997 |
| EP | 839 683 | 5/1998 |
| EP | 1386771 A2 * | 2/2004 |
| JP | 47-31773 | 8/1972 |
| JP | 50-30223 | 3/1975 |
| JP | 50-018136 A | 6/1975 |
| JP | (U) 57-059124 A | 4/1982 |
| JP | 6-144020 | 5/1994 |
| JP | 8-183347 | 7/1996 |
| JP | 9-226392 | 9/1997 |
| JP | 9-226393 | 9/1997 |
| JP | 10-58990 | 3/1998 |
| JP | 2000-142146 | 5/2000 |
| JP | 2000-343964 | 12/2000 |
| JP | 2000-346187 | 12/2000 |
| JP | 2001-18668 | 1/2001 |
| JP | 2001-138752 | 5/2001 |
| JP | 2001-231107 | 8/2001 |

* cited by examiner

DRIVE APPARATUS FOR HYBRID VEHICLE

BACKGROUND OF THE INVENTION

1. Field of the Invention

The invention relates to a drive apparatus for a hybrid vehicle that is preferably used in a hybrid vehicle provided with an engine and an electric motor, which are two types of power sources having different characteristics, and which runs by using the driving power from these two power sources in a combination that is optimal for the conditions.

2. Description of the Related Art

In recent years a hybrid vehicle provided with an engine and an electric motor, which are two types of power sources having different characteristics, has been developed and put into practical use. In this hybrid vehicle, the strengths of each power source are used to compensate for the weaknesses of the other by using the driving power from the type types of power sources in a combination that is optimal for the conditions. As a result, the power performance of the vehicle is able to be sufficiently ensured and the fuel consumption rate and emission performance are able to be largely improved.

Various proposals have been made for the drive apparatus to be used in this type of hybrid vehicle. One proposal includes the use of a first motor generator, a power splitting mechanism portion, and a second motor generator. The first motor generator serves mainly as a generator. The power splitting mechanism portion includes a planetary gear set and divides the power generated by the engine into power for the first motor generator and power for the driven wheels. The second motor generator serves mainly as a motor and generates power to assist in driving the driven wheels. This power is different from the power that is from the engine.

In this drive apparatus, part of the power that has been split by the power splitting mechanism portion is transmitted mechanically to the driven wheel to rotate it, and the rest of the power that has been split is transmitted to the first motor generator. Using the power transmitted to the first motor generator, the first motor generator functions as a generator and generates electricity which is supplied to the second motor generator. Using this electricity, the second motor generator functions as a motor. The power generated by this second motor generator is added to the power that was split by the power splitting mechanism portion and transmitted to the driven wheel, thereby assisting the output of the engine in driving the driven wheel.

Also, as art relating to the layout of each of the component parts in the drive apparatus for a hybrid vehicle, art in which a first motor generator, a second motor generator, and a planetary gear set are arranged in-line is disclosed in Japanese Patent Application Laid-Open Publication No. 6-144020. This arrangement is advantageous in that the build, more particularly the outside diameter, becomes gradually smaller farther away from the engine, thereby enabling the entire apparatus to be made compact.

With the drive apparatus for a hybrid vehicle, it is conceivable to add a speed reducing mechanism portion to reduce the rotation speed and to increase the torque of the second motor generator which serves as the motor. With the drive apparatus disclosed in the aforementioned publication, however, a layout when this speed reducing mechanism portion is added to the planetary gear set as a power splitting mechanism portion is not shown in detail. Therefore, there is a desire for a drive apparatus in which the entire apparatus, including this speed reducing mechanism portion, can be made compact.

SUMMARY OF THE INVENTION

In view of the foregoing circumstance, it is an object of this invention to provide a drive apparatus for a hybrid vehicle in which a speed reducing mechanism portion is able to be mounted while making the entire apparatus compact.

Hereinafter, the method and effects for achieving the foregoing object shall be described.

A drive apparatus for a hybrid vehicle according to a first aspect of the invention to achieve the foregoing object is provided with a first motor generator which functions as one of a motor and a generator; a power splitting mechanism portion that divides power generated by an engine into power for the first motor generator and power for a driven wheel; a second motor generator which is arranged on a side of the first motor generator opposite the engine, which functions as one of a motor and a generator, which generates power to drive the driving wheel, this power being different from the power that is from the engine, and which has an outside diameter that is smaller than an outside diameter of the first motor generator; and a speed reducing mechanism portion which is arranged on a side of the second motor generator opposite the engine, which has an outer diameter that is smaller than an outside diameter of the second motor generator, and which reduces a rotation speed and increases a torque of the second motor generator.

According to the drive apparatus for a hybrid vehicle of the aforementioned construction, the power generated by the engine is divided into two by the power splitting mechanism portion. Part of the power is transmitted mechanically to the driven wheel so as to rotate it and the rest of the power is transmitted to the first motor generator. Using the power transmitted to the first motor generator, the first motor generator functions as a generator and generates electricity which is supplied to the second motor generator. Using this electricity, the second motor generator functions as a motor. The power generated by this second motor generator is added to the power that was split by the power splitting mechanism portion and transmitted to the wheels, thereby assisting the output of the engine in driving the driven wheel.

According to the drive apparatus for a hybrid vehicle, at least both of the motor generators and the speed reducing mechanism portion, from among the component parts, are arranged in the order of the first motor generator, the second motor generator, and the speed reducing mechanism portion from the side near the engine to the side away from the engine. In addition to the outside diameter of the second motor generator being smaller than the outside diameter of the first motor generator, the outside diameter of the speed reducing mechanism portion is also smaller than the outside diameter of the second motor generator. Therefore, by having the outside diameter of the power splitting mechanism portion be smaller than the outside diameter of the first motor generator, the drive apparatus takes on a conical shape in which the outside diameter thereof becomes increasingly small away from the engine. In this way, according to the invention described above, it is possible to incorporate the speed reducing mechanism portion into the drive apparatus while making the entire apparatus compact.

Furthermore, the mountability in the hybrid vehicle of this drive apparatus that has been made compact in this way is excellent. In particular, the shape of the entire drive apparatus for a hybrid vehicle is substantially the same as the shape of a typical automatic transmission with a torque converter and a gear change mechanism. Therefore, by designing the drive apparatus for a hybrid vehicle so that it is substantially the same size as the automatic transmission, the drive apparatus is able to be housed in a floor tunnel that already exists in vehicles for housing the automatic transmission. Therefore, it is possible to arrange the drive apparatus, instead of the automatic transmission, in this floor tunnel.

A drive apparatus for a hybrid vehicle according to another aspect of the invention has an outside shape that becomes increasingly narrow away from the engine, and is further provided with a core case in which to mount both of the motor generators and the power splitting mechanism portion, a case formed separate from the core case, in which to mount the speed reducing mechanism portion, and a joining portion with which to join the case to the core case.

According to this construction, when expanding the use of the drive apparatus to a wide variety of hybrid vehicles, if the specifications, such as those of the gear ratio of the speed reducing mechanism portion, can be conformed to the vehicle, the motor generators and the power splitting mechanism portion and the like can be used as they are as common parts. Here, the case in which the speed reducing mechanism portion is mounted is independent from the core case in which both of the motor generators and the power splitting mechanism portion are mounted, and these cases can be joined to, and separated from, one another. As a result, by preparing a unit part in which the speed reducing mechanism portion is mounted in the case for each type of hybrid vehicle, there only needs to be one type of unit (core unit) in which both of the motor generators and the power splitting mechanism portion are mounted in the core case, regardless of the type of the hybrid vehicle. Then, when assembling a plurality of kinds of the drive apparatuses in an assembly plant or the like, the unit part in which the particular speed reducing mechanism portion that matches the type of drive apparatus is simply selected and attached to the common core unit.

Further, a drive apparatus for a hybrid vehicle according to another aspect of the invention is further provided with a first connecting portion to electrically connect a first cable to the first motor generator, and a second connecting portion to electrically connect a second cable to the second motor generator. In addition, the power splitting mechanism portion is arranged between the first motor generator and the second motor generator and includes a planetary gear set which has a ring gear that has a smaller outside diameter than the outside diameters of the first motor generator and the second motor generator. The first connecting portion and the second connecting portion are provided in a space that exists toward the outside in the radial direction of the ring gear between the first motor generator and the second motor generator.

According to this construction, the power splitting mechanism portion is constructed with a planetary gear set arranged between the two motor generators. In addition, the outside diameter of the ring gear, which determines the outer shape of the entire planetary gear set, is smaller than the outside diameters of both of the motor generators. As a result, a space is created toward the outside in the radial direction of the ring gear between the two motor generators. According to this invention described above, a first connecting portion to electrically connect a first cable to the first motor generator is provided in this space. In addition, a second connecting portion to electrically connect a second cable to the second motor generator is also provided in this space. In this way, by providing both of the connecting portions together in the space between the motor generators, space is able to be used efficiently. As a result, both connecting portions are able to be arranged without losing compactness of the drive apparatus.

A drive apparatus for a hybrid vehicle according to another aspect of the invention is further provided with a drive case in which the first motor generator and the second motor generator are mounted, and which has an outside shape that becomes increasingly narrow away from the engine; a first outlet, which is provided in the drive case and which is formed curved away from the engine, and through which the first cable that is connected to the first motor generator is led out of the drive case; and a second outlet, which is provided in the drive case on a side of the first outlet opposite the engine and which is formed parallel to the first outlet, and through which the second cable that is connected to the second motor generator is led out of the drive case.

According to this construction, the first cable that is connected to the first motor generator is led out of the drive case through the first outlet. Also, the second cable that is connected to the second motor generator is led out of the drive case through the second outlet. Here, the first outlet and the second outlet are both provided in the drive case which becomes increasingly narrow away from the engine. Also, the second outlet is positioned on the side of the first outlet opposite the engine, i.e., in a location having a smaller diameter than the first outlet in the drive case. In addition, both the first outlet and the second outlet are curved away from the engine and parallel to each other. As a result, when the connection mates of both of the cables are provided on the side of the drive apparatus opposite the engine, both of the cables can be led out to the outside of the drive case together without interfering with one another and laid toward the connection mate.

Also, a drive apparatus for a hybrid vehicle according to another aspect of the invention is further provided with a drive case which has an outside shape that becomes increasingly narrow away from the engine and in which the first motor generator and the second motor generator are mounted; a first case which forms part of the drive case and which is provided with a first main portion fixed to the engine and a first housing portion formed within the first main portion, which houses the first motor generator; a second case which forms part of the drive case and which is joined to the first main portion; a first cover which is arranged on the engine side of the first generator within the first main portion and which covers the first motor generator; and a first fastening member that attaches a first flange formed on an outer edge portion of the first cover to the first housing portion.

According to this construction, in this drive apparatus, the drive case in which the motor generator is mounted has an outside shape that becomes increasingly narrow away from the engine. The first case that forms part of the drive case is fixed to the engine at the first main portion which is the outside portion (outer shell) of the first case. The motor generator is housed in the first housing portion formed within the first main portion. Also, the second case that forms part of the drive case, just as does the first case, is joined to the first main portion.

A cover, which covers the motor generator, is arranged within the first main portion. The cover is attached to the first housing portion by a first fastening member at a flange formed on an outer edge portion of the cover. Here, when the cover is not used, the size (outside diameter) in the radial direction of the first case is used as a reference. In this case, the outside diameter of the first case is actually determined only by the thickness of the first main portion. In contrast, when the cover is used, the outside diameter of the first case is determined by a width of the flange on the cover and a gap between the flange and the inside surface of the first main portion, in addition to the aforementioned thickness of the first main portion.

Regarding this point, according to the invention described above, the cover is arranged on the engine side of the motor generator within the first main portion. The outside diameter of the first main portion at this location is comparatively larger than the general outside diameter around the first main portion. In particular, the diameter of the first main portion at a location corresponding to the end portion on the engine side of the first housing portion is definitely larger than the diameter of the first main portion at a location corresponding to the end portion on the side of the first housing portion opposite the engine. The size relationship of the distance between the inside surface of the first housing portion and the inside surface of the first main portion is the same as described above. Therefore, because the distance tends to be larger than the sum of the width of the first flange on the first cover and the gap between the first flange and the first main portion, in this case, even if the first main portion does not extend outward in the radial direction, the first cover can still be arranged within the first main portion and attached to the first housing portion by the first fastening member.

In this way, it is possible to suppress the outside diameter of the first case from becoming larger with the first cover attached, and therefore maintain the original outer shape of the drive case, in which it becomes increasingly narrow away from the engine. This outer shape is similar to the outer shape of an automatic transmission provided with a torque converter and a gear change mechanism, which is housed in a vehicle having a front engine rear drive (i.e., FR) type drive system. As a result, it is possible to arrange the drive apparatus, instead of an automatic transmission, in a floor tunnel that ordinarily houses the automatic transmission, and thus improve mountability of the drive apparatus in the vehicle.

Also, the drive apparatus for a hybrid vehicle is further provided with a second main portion which is provided with the second case and which is joined to the first main portion; a second housing portion which is formed within the second main portion and which houses a second motor generator that functions as one of a motor and a generator; a second cover which is arranged on the engine side of the second motor generator within the second main portion and which covers the second motor generator; and a second fastening member that attaches a second flange formed on an outer edge portion of the second cover to the second housing portion.

According to this construction, in this drive apparatus, the second case that forms part of the drive case, just as does the first case, is joined to the first main portion at the second main portion that is the outside portion (outer shell) of the second case. The second motor generator is housed in the second housing portion formed within the second main portion.

A second cover that covers the second motor generator is formed within the second main portion. This second cover is attached to the second housing portion by second fastening member at a second flange formed on an outer edge portion of the second cover. Here, when the cover is not used, the size (outside diameter) in the radial direction of the second case is used as a reference. In this case, the outside diameter of the second case is actually determined only by the thickness of the second main portion. In contrast, when the cover is used, the outside diameter of the second case is determined by a width of the second flange on the second cover and a gap between the second flange and the inside surface of the second main portion, in addition to the aforementioned thickness of the second main portion.

This drive apparatus for a hybrid vehicle is such that the second cover is arranged on the engine side of the second motor generator within the second main portion. The outside diameter of the second main portion in this location is comparatively larger than the general outside diameter around the second main portion. In particular, the outside diameter of the second main portion in the location corresponding to the end portion on the engine side of the second housing portion is definitely larger than the outside diameter of the second main portion at a location corresponding to the end portion on the side of the second housing portion opposite the engine. The size relationship of the distance between the inside surface of the second housing portion and the inside surface of the second main portion is the same as described above. Therefore, because the distance tends to be larger than the sum of the width of the second flange on the second cover and the gap between second flange and the inside surface of the second main portion, in this case, even if the second main portion does not extend outward in the radial direction, the second cover can still be arranged within the second main portion and attached to the second housing portion by the second fastening member. In this way, it is possible to suppress the outside diameter of the second case from becoming larger with the second cover attached, such that mountability of the drive apparatus in the vehicle is further improved.

In the drive apparatus for a hybrid vehicle, the speed reducing mechanism portion includes a planetary gear set and is arranged on the same axis as the axial center of the first motor generator, the second motor generator, and the power splitting mechanism portion.

According to this construction, the speed reducing mechanism portion can achieve a large reduction ratio because it includes a planetary gear set. Also, the size of the drive system in the radial direction is minimized by arranging the first motor generator, the second motor generator, the power splitting mechanism portion, and the speed reducing mechanism portion, which together make up the drive apparatus, on the same axis.

DETAILED DESCRIPTION OF PREFERRED EMBODIMENTS

Figure 1:
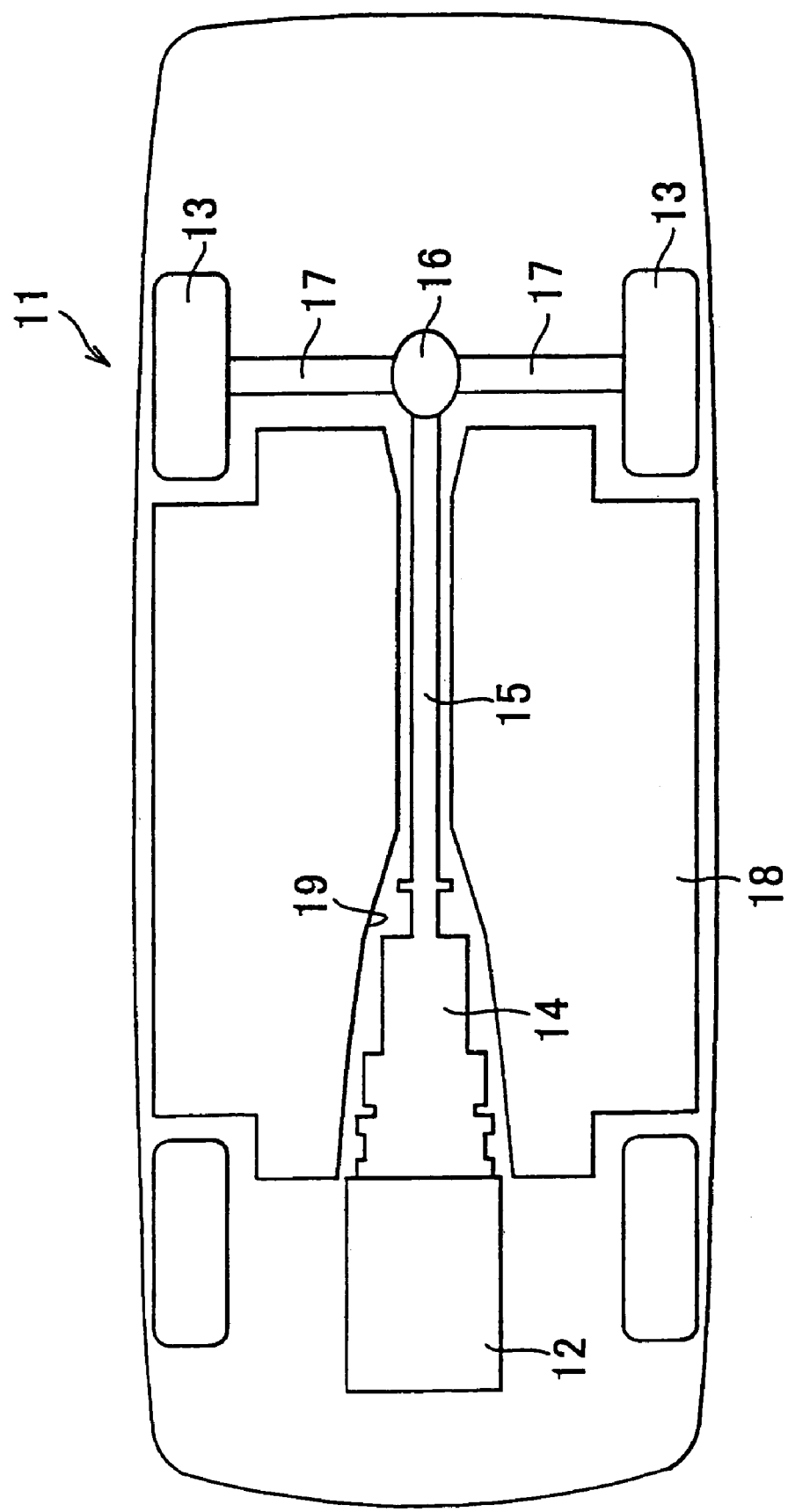
FIG. 1 is a bottom view schematically showing a hybrid vehicle having a drive apparatus which is a first exemplary embodiment of the invention.

Hereinafter, a first exemplary embodiment of the invention, in which a hybrid vehicle having a front engine rear drive (i.e., FR) type drive system has been implemented, will be described with reference to the drawings. FIG. 1 is a block diagram schematically showing a hybrid vehicle 11 as seen from below. The hybrid vehicle 11 shown here is provided with two types of power sources, an engine 12 and an electric motor, which have different characteristics. The hybrid vehicle 11 runs by transmitting driving power to driven wheels 13 from these two power sources in a combination that is optimal for the conditions. In the figure, the front of the hybrid vehicle 11 is to the left and the rear is to the right.

Between the engine 12 and the driven wheels 13 are provided a drive apparatus 14, a propeller shaft 15, a differential 16, and a pair of axle shafts 17 and the like. The drive apparatus 14 will be described in detail later. The propeller shaft 15 is a shaft that transmits output force from the drive apparatus 14 to the differential 16. The differential 16 is a differential gear that divides power from the propeller shaft 15 and transmits it to both of the axle shafts 17. Each axle shaft 17 is an axle that transmits the power divided by the differential 16 to the driven wheels 13.

Among these parts, the drive apparatus 14 and the propeller shaft 15 are arranged in a floor tunnel 19 provided in a floor 18 of the hybrid vehicle 11. The portion of the floor tunnel 19 in which the drive apparatus 14 is arranged is widest near the engine 12 and becomes increasingly narrow away from the engine 12. In a vehicle having an FR type drive system such as this, the space in the floor tunnel 19 is used to house the drive apparatus 14 and the propeller shaft 15. This space is narrower than the housing space in a vehicle having a different type of drive system such as a front engine front drive (i.e., FF) type system.

Figure 2:
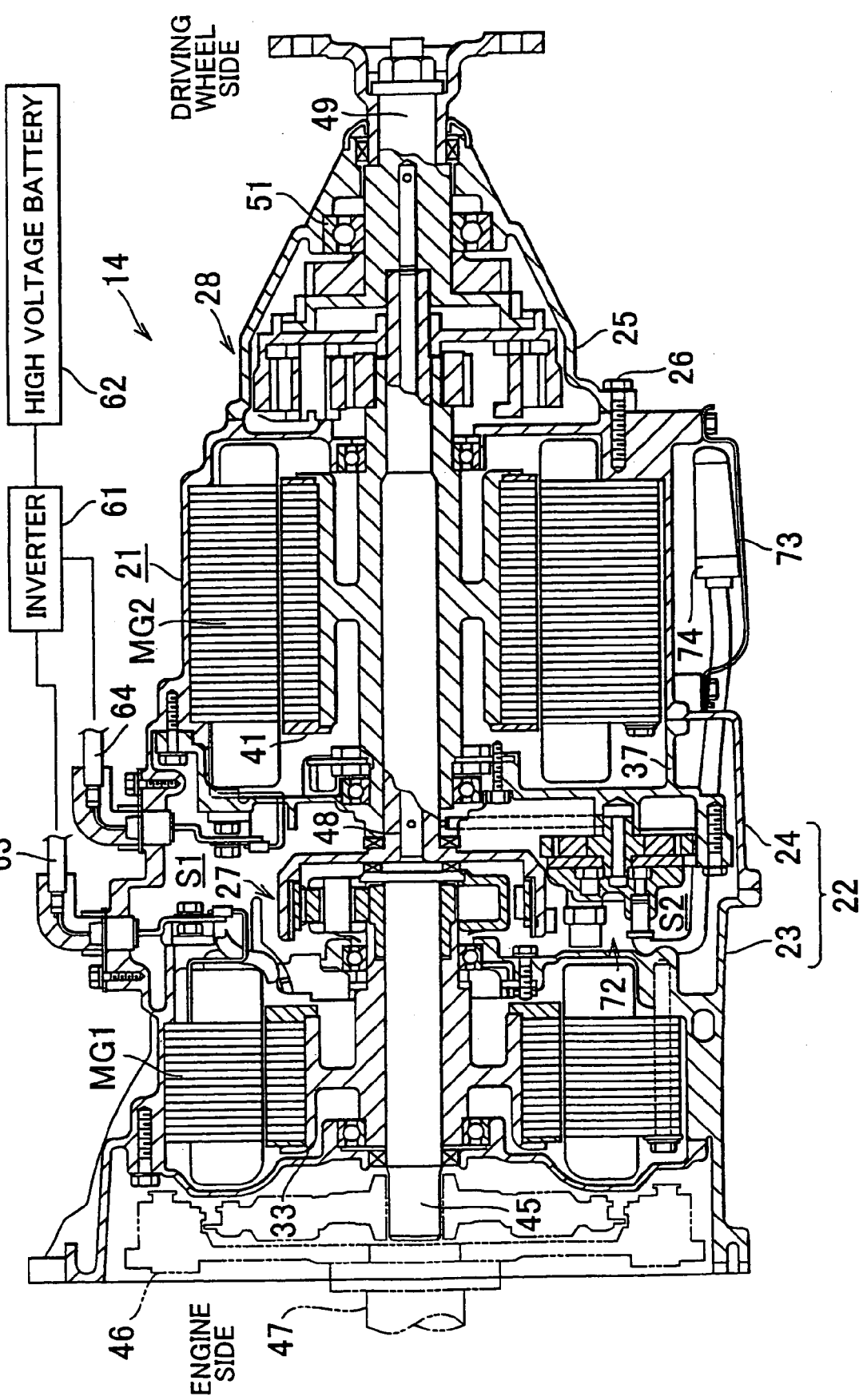
FIG. 2 is a cross-sectional view of the drive apparatus according to the first exemplary embodiment.

As shown in FIG. 2, a drive case 21 of the drive apparatus 14 includes a core case 22 which is formed of a first case 23 and a second case 24, and a third case 25. These cases 23 through 25 are arranged in order along an axial line L of a crankshaft 47, which is an output shaft of the engine 12, toward the side (the right side in FIG. 2) away from the side near the engine 12 (the left side in FIG. 2).

Figure 4:
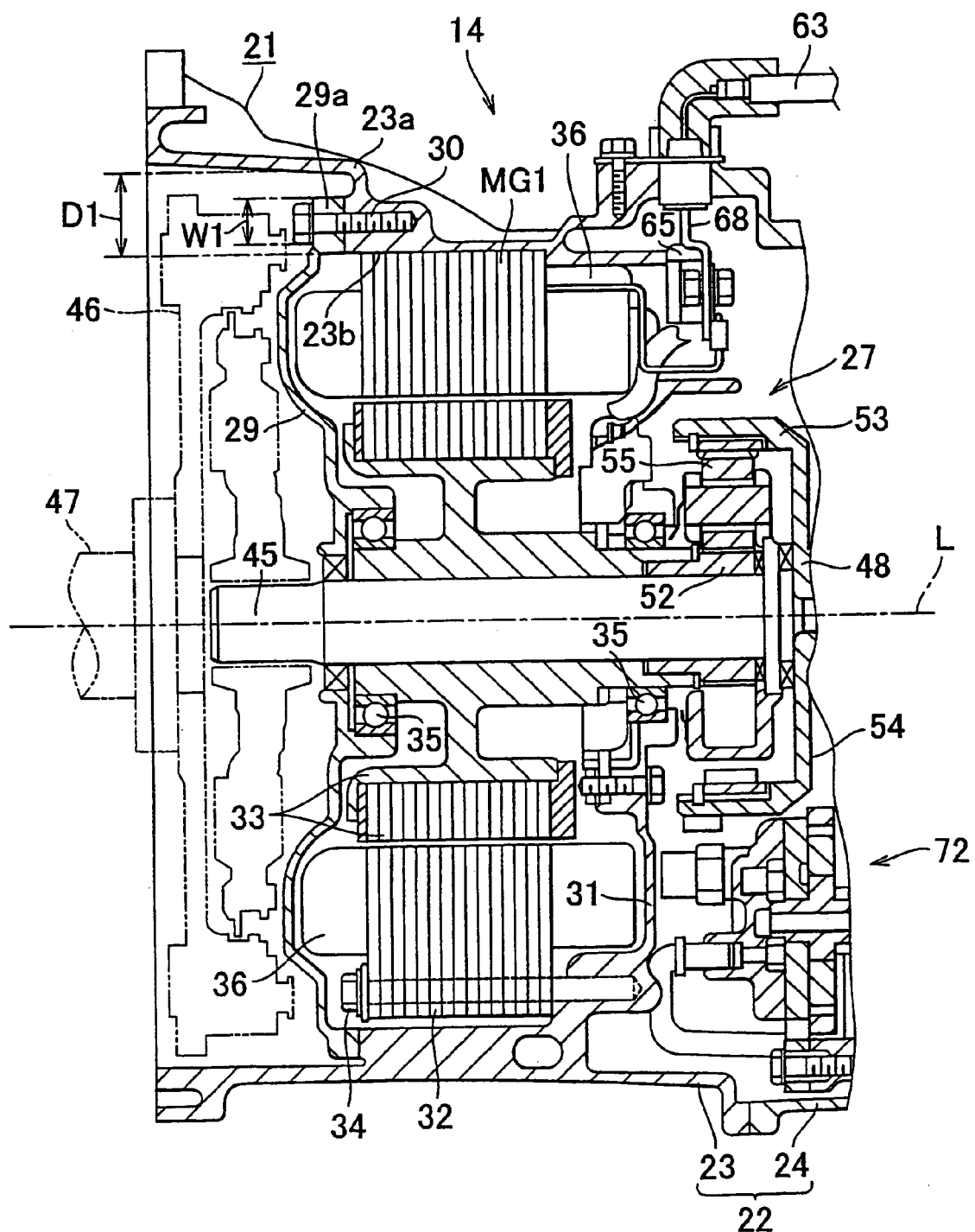
FIG. 4 is an expanded view of part of the drive apparatus shown in FIG. 2.

Referring to FIG. 4, the first case 23 includes a first main portion 23a, which is the outside (outer shell) portion of the first case 23, and a first housing portion 23b integrally formed with the inner portion of the first main portion 23a. The first main portion 23a has a cylindrical outer shape and is fastened at an end portion thereof on the engine 12 side to the engine 12 with a fastening member, not shown, such as a bolt. The diameter (both outside diameter and inside diameter) of the first main portion 23a is greatest at the end portion on the engine 12 side and gradually decreases farther away from the engine 12 until the mid portion in the axial direction. The diameter of the first main portion 23a at the end portion on the driven wheel side is partly and slightly larger than the diameter of the mid portion in the axial direction in order to ensure space to attach a first cable 63, to be described later.

The first housing portion 23b has a substantially cylindrical shape with one end closed, in which the inside diameter is substantially the same at any given location. The end portion of the first housing portion 23b on the engine side does not extend as far (toward the driven wheels 13 side) as the end portion of the first main portion 23a on the engine side. Also, the end portion of the first housing portion 23b on the driven wheel side does not extend as far (toward the engine 12 side) as the end portion of the first main portion 23a on the driven wheel side. The end portion of the first housing portion 23b is constructed with a first support wall 31 formed substantially orthogonal with respect to the axial line L at the end portion of the first housing portion 23b on the driven wheel side.

Figure 5:
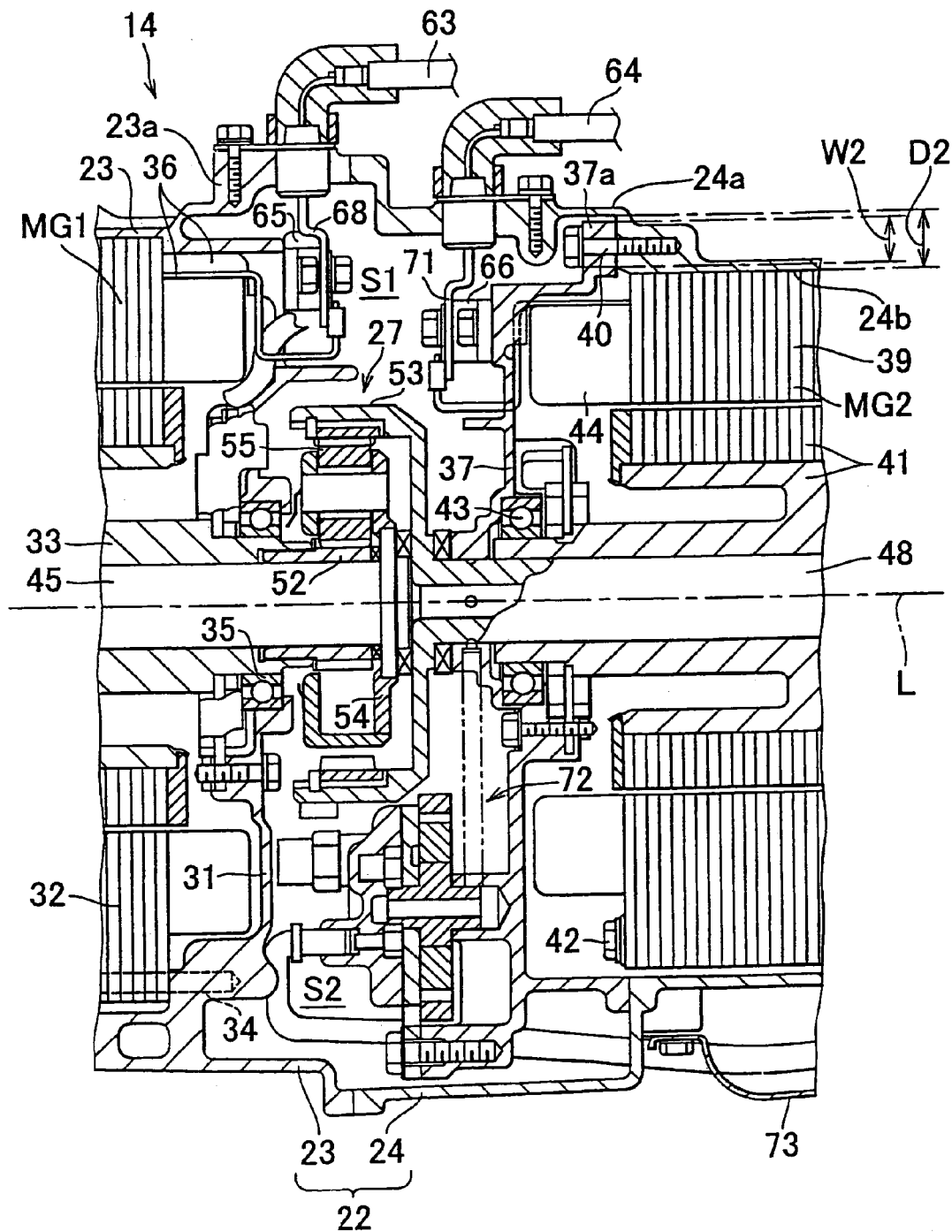
FIG. 5 is an expanded view of part of the drive apparatus shown in FIG. 2.
Figure 6:
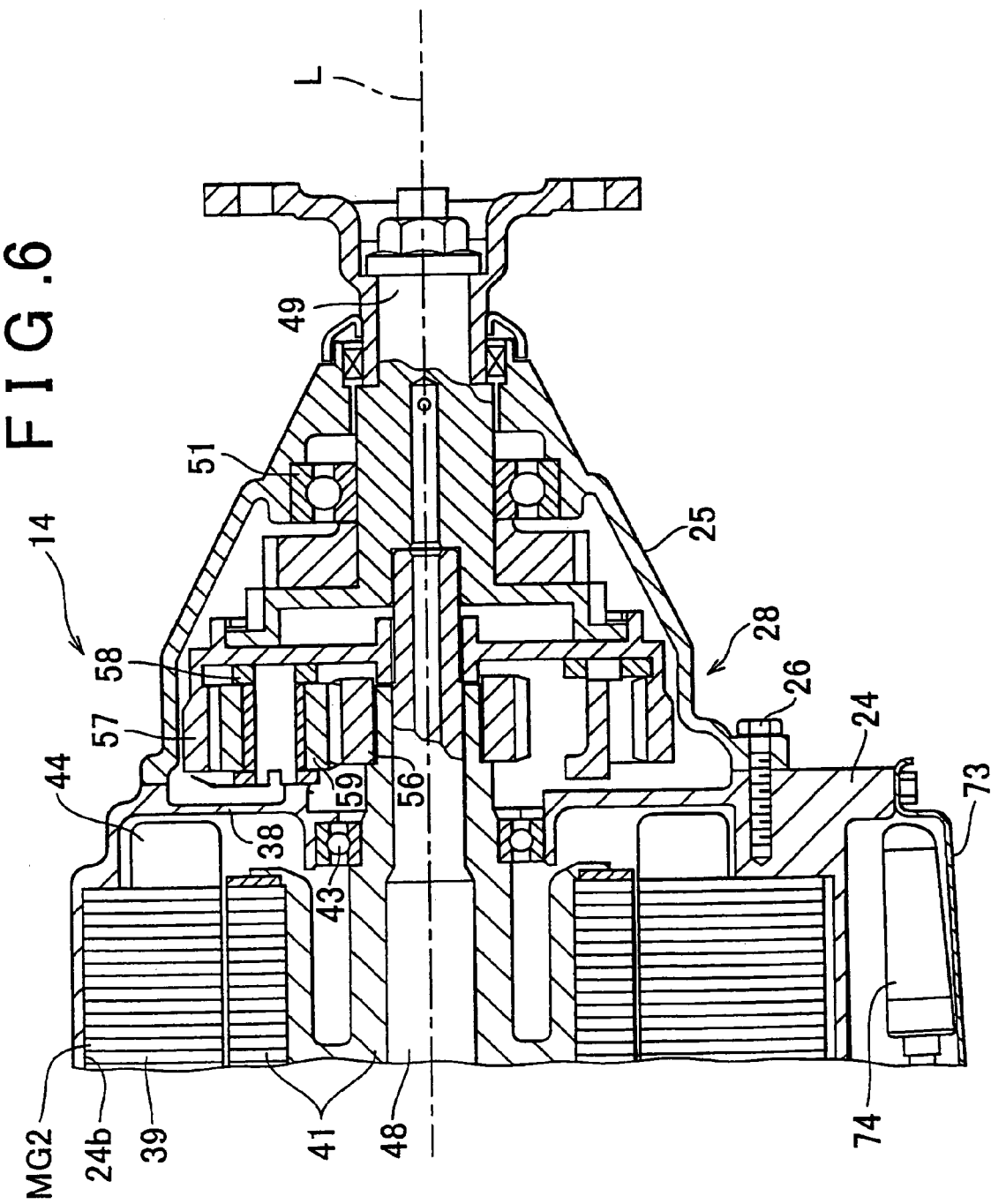
FIG. 6 is an expanded view of part of the drive apparatus shown in FIG. 2.

As shown in FIGS. 5 and 6, a second case 24 includes a second main portion 24a which forms the outside (outer shell) portion of the second case 24 and a second housing portion 24b integrally formed with the inner portion of the second main portion 24a. The second main portion 24a has a substantially cylindrical external shape and is fastened at an end portion thereof on the engine side to the first main portion 23a with a fastening member, not shown, such as a bolt. The diameter (both outside diameter and inside diameter) of the second main portion 24a is greatest at the end portion on the side of the engine 12 and gradually decreases farther away from the engine 12 until the mid portion in the axial direction.

The second housing portion 24b has a substantially cylindrical shape with one end closed, and has a slightly smaller diameter than the first housing portion 23b described above. The inside diameter of the second housing portion 24b is substantially the same in any given location. The end portion of the second housing portion 24b on the engine side does not extend as far (toward the driven wheel 13 side) as the end portion of the second main portion 24a on the engine side. Also, the end portion of the second housing portion 24b on the driven wheel side is in substantially the same position with respect to the axial line L as the end portion of the second main portion 24a on the driven wheel side. The end portion of the second housing portion 24b is constructed with a second support wall 38 formed substantially orthogonal with respect to the axial line L at the end portion of the second housing portion 24b on the driven wheel side.

Referring to FIG. 6, the third case 25 has a conical shape in which the diameter (both outside diameter and inside diameter) becomes increasingly smaller farther away from the engine 12. The third case 25 is fastened at an end portion thereof on the engine side to the second case 24 by a fastening member 26 such as a bolt.

The drive case 21 formed of the first through the third cases 23 through 25 in this way has an outer shape in that becomes increasingly narrow away from the engine 12. This outer shape is similar to the outer shape of a typical automatic transmission provided with a fluid type torque converter and a gear change mechanism, which is housed in a vehicle having a FR type drive system.

Referring back to FIG. 2, a first motor generator (hereinafter referred to as "MG"), a power splitting mechanism portion 27, a second motor generator (hereinafter referred to as "MG") and a speed reducing mechanism portion 28 are arranged in-line on the axial line L in the drive case 21 in that order from the side near the engine 12 to the side away from the engine 12 (i.e., toward the driven wheels 13 side). The MG1 and the MG2 are both constructed of an electric motor, such as an alternating current synchronized motor, that can switch to function as either a generator or an electric motor depending on the conditions. During normal running of the vehicle, however, the MG1 mainly serves as a generator that generates electricity by the power from the engine 12. Further, the MG2 mainly serves as a motor that generates power to assist the engine 12. Phrased differently, when the MG2 functions as a motor, it provides power that is used to assist the power of the engine 12 as necessary, and thus serves as an auxiliary power source to the engine 12 to increase the driving force of the vehicle. Of course, the MG1 and MG2 may, instead of both being able to function as both a generator and a motor, each have only one of those functions.

Next, the MG1 and MG2 will be described. Referring to FIG. 4, a first cover 29 is arranged substantially orthogonal to the axial line L and on the engine 12 side of the first housing portion 23b in the first case 23. The first cover 29 is large enough to close off the open end of the first housing portion 23b on the engine side. A first flange 29a is formed on the outer edge portion of the first cover 29, and this first flange 29a of the first cover 29 overlaps with the end portion of the first housing portion 23b on the engine side. Then, a first bolt 30 which is a first fastening member, of a plurality of bolts (only one bolt is shown in FIG. 4) as first attaching means is inserted from the engine 12 side through the first flange 29a and screwed into the first housing portion 23b. In this way, with the first cover 29 fastened to the first case 23, a closed space is formed by the first housing portion 23b and the first cover 29 for housing the MG1 and the like.

Here, in order to form a through hole for the first bolt 30 and ensure a predetermined strength, the first flange 29a must be of a certain width (i.e., have a certain thickness in the radial direction) w1. Also, in order to tighten and loosen the first bolt 30, there must be a certain amount of space between the inside surface of the first flange 29a and the inside surface of the first main portion 23a. For the sake of convenience in this description, this space or gap will be hereinafter be referred to as "gap g1". Regarding this, according to this exemplary embodiment, a distance D1 between the inside surface of the end portion on the driven wheel side of the first housing portion 23b and the corresponding inside surface of the first main portion 23a is shorter than the sum of the width w1 and the gap g1. However, the distance D1 between the inside surface of the end portion on the engine side of the first housing portion 23b and the corresponding inside surface of the first main portion 23a is larger than the sum of the width w1 and the gap g1. This is because while the inside diameter of the first housing portion 23b is substantially constant at any given location, the diameter of the first main portion 23a becomes smaller farther away from the engine 12. Then, with the first cover 29 fastened to the first case 23, a gap is formed between the inside surface of the first flange 29a and the inside surface of the first main portion 23a.

The MG1 is provided with a first stator 32 and a first rotor 33. The first stator 32 is arranged near the inside surface of the first housing portion 23b and is fastened to the first support wall 31 by a fastening member 34 such as a bolt. Also, the first rotor 33 is rotatably supported with respect to both the center portion of the first cover 29 and the center portion of the first support wall 31 by a bearing 35. Then, the first rotor 33 rotates by energizing a stator coil 36 of the first stator 32 in the MG1 mounted in the first case 23, as described above.

As shown in FIGS. 5 and 6, a second cover 37 is arranged substantially orthogonal to the axial line L and on the engine 12 side of the second housing portion 24b within the second case 24. This second cover 37 is large enough to close off the open end of the second housing portion 24b on the engine side. On the outer edge portion of the second cover 37 is formed a second flange 37a, which overlaps with the end portion of the second housing portion 24b on the engine side. Then, a second bolt 40 which is a second fastening member, of a plurality of bolts (only one bolt is shown in FIG. 5) as second attaching means is inserted through the second flange 37a from the engine 12 side and screwed into the second housing portion 24b. In this way, with the second cover 37 fastened to the second case 24, a closed space is formed for housing the MG2 and the like by the second housing portion 24b and the second cover 37.

Here, in order to form a through hole for the second bolt 40 and ensure a predetermined strength, the second flange 37a must be of a certain width (i.e., have a certain thickness in the radial direction) w2. Also, in order to tighten and loosen the second bolt 40, there must be a certain amount of space between the inside surface of the second flange 37a and the inside surface of the second main portion 24a. For the sake of convenience in this description, this space or gap will be hereinafter be referred to as "gap g2". Regarding this, according to this exemplary embodiment, a distance D2 between the inside surface of the end portion on the driven wheel side of the second housing portion 24b and the corresponding inside surface of the second main portion 24a is smaller than the sum of the width w2 and the gap g2. However, the distance D2 between the inside surface of the second housing portion 24b of the end portion on the engine side and the corresponding inside surface of the second main portion 24a is larger than the sum of the width w2 and the gap g2. This is because while the inside diameter of the second housing portion 24b is substantially constant at any given location, the diameter of the second main portion 24a becomes increasingly smaller away from the engine 12. Then, with the second cover 37 fastened to the second case 24, a gap is formed between the inside surface of the second flange 37a and the inside surface of the second main portion 24a.

The MG2 is provided with a second stator 39 and a second rotor 41. The second stator 39 has a slightly smaller outside diameter, and is longer, than the first stator 32 of the MG1. The second stator 39 is arranged near the inside surface of the second housing portion 24b and is fastened to the second support wall 38 by a fastening member 42 such as a bolt. Also, the second rotor 41 has a slightly smaller outside diameter, and is longer, than the first rotor 33 of the MG1. The second rotor 41 is rotatably supported with respect to both the center portion of the second cover 37 and the center portion of the second support wall 38 by a bearing 43. Then, the second rotor 41 rotates by energizing a stator coil 44 of the second stator 39 in the MG2 mounted in the second case 24, as described above.

As shown in FIG. 2, an input shaft 45 is inserted through the center portion of first cover 29, the first rotor 33, and the first support wall 31 so as to be rotatable relative to each of these. This input shaft 45 is coupled via a transmission damper 46 to a crankshaft 47 which serves as the output shaft of the engine 12. Similarly, a middle shaft 48 is inserted through the axial center portion of the second cover 37, the second rotor 41, and the second support wall 38 so as to be rotatable relative to each of these. Meanwhile, an output shaft 49 that has a larger diameter than the input shaft 45 and the middle shaft 48 is inserted into the third case 25. This output shaft 49 is rotatably supported in the third case 25 by a bearing 51 and the like. The output shaft 49 is linked to the driven wheels 13 via the propeller shaft 15, the differential 16, and the axle shafts 17, and the like. The middle shaft 48 is coupled to the output shaft 49 directly, to be described later.

The power splitting mechanism portion 27 is a mechanism for appropriately splitting the power from the engine 12 into vehicle driving force for directly driving the driven wheels 13 and generator driving force for operating the MG1 to generate electricity. The power splitting mechanism portion 27 is disposed in the core case 22, in a space between the MG1 and the MG2. As shown in FIG. 5, the power splitting mechanism portion 27 includes a planetary gear set in which a sun gear 52, a ring gear 53, and a planetary carrier 54 having the same axial center are rotatably interlocked together. The sun gear 52 is interlocked, so as to be able to integrally rotate, with the first rotor 33 of the MG1 on the input shaft 45. The ring gear 53 has a smaller diameter than the outside diameter of the first stator 32 of the MG1 and second stator 39 of the MG2, and is mounted to the end portion on the engine 12 side of the middle shaft 48. The planetary carrier 54 is attached so as to be able to integrally rotate with the input shaft 45. A pinion gear 55 is rotatably supported by the planetary carrier 54. The pinion gear 55 is positioned between the sun gear 52 and the ring gear 53 and is rotatably meshed with both of the sun gear 52 and the ring gear 53.

Then, with the power splitting mechanism portion 27 constructed in this way, power generated by the engine 12 and transmitted to the input shaft 45 is then transmitted to the first rotor 33 of the MG1 via the planetary carrier 54, the pinion gear 55, and the sun gear 52. Further, the power transmitted to the input shaft 45 is then transmitted to the ring gear 53 (i.e., the middle shaft 48) via the planetary carrier 54 and the pinion gear 55.

In the power splitting mechanism portion 27 described above, the outside diameter of the ring gear 53 is smaller than the outside diameter of the MG1 and the MG2. Therefore, a space S1 and a space S2 of a predetermined size are created between the MG1 and the MG2 in the core case 22, toward the outside in the radial direction of the ring gear 53 of the power splitting mechanism portion 27.

As shown in FIG. 6, the speed reducing mechanism portion 28 includes a planetary gear set in which a sun gear 56, a ring gear 57, and a planetary carrier 58 having the same axial center are rotatably interlocked together, which is similar to the power splitting mechanism portion 27. The entire structure is then arranged within the third case 25. The sun gear 56 is interlocked so as to be able to integrally rotate with the second rotor 41 of the MG2. The ring gear 57 is interlocked so as to be able to integrally rotate with the middle shaft 48 and the output shaft 49. The planetary carrier 58 is fixed to the second support wall 38 of the second case 24. On the planetary carrier 58, a pinion gear 59 is rotatably supported. This pinion gear 59 is positioned between, and is meshed so as to be able to rotate (freely) with, the sun gear 56 and the ring gear 57. Then, with the speed reducing mechanism portion 28 constructed in this way, rotation of the second rotor 41 of the MG2 is transmitted to the output shaft 49 via the sun gear 56, the pinion gear 59, and the ring gear 57. Speed reduction is accomplished by this transmission process. The rotation with increased torque due to this speed reduction is applied to the output shaft 49 to assist the driving force of the engine 12.

As shown in FIG. 2, the MG1 and the MG2 are both connected to a high voltage battery 62 via an inverter 61. The inverter 61 and the high voltage battery 62 are disposed farther to the rear in the forward-backward direction of the vehicle than the drive apparatus 14. The inverter 61 is an apparatus that controls the current while converting the high voltage direct current from the high voltage battery 62 to alternating current for the MG1 and the MG2.

A first cable 63 is used to electrically connect the MG1 to the inverter 61. Further, a second cable 64 is used to electrically connect the MG2 to the inverter 61. For the first cable 63 and the second cable 64, a cable capable of withstanding high voltage is used. Further, the space S1 in the core case 22 is used to connect the first cable 63 with the MG1 and the second cable 64 with the MG2.

More specifically, as shown in FIG. 5, a first connecting portion 65 is provided on the first support wall 31. Here, this first connecting portion 65 is formed with a protruding portion that protrudes from an upper portion of the first support wall 31 toward the MG2 side. Then, the stator coil 36 of the MG1 and a first connecting terminal 68 of the first cable 63 are electrically connected at the first connecting portion 65. Similarly, a second connecting portion 66 is provided on the second cover 37. Here, this second connecting portion 66 is formed with a protruding portion that protrudes from an upper portion of the second cover 37 toward the MG1 side. Then, the stator coil 44 of the MG2 and a second connecting terminal 71 of the second cable 64 are electrically connected at the second connecting portion 66.

Figure 3:
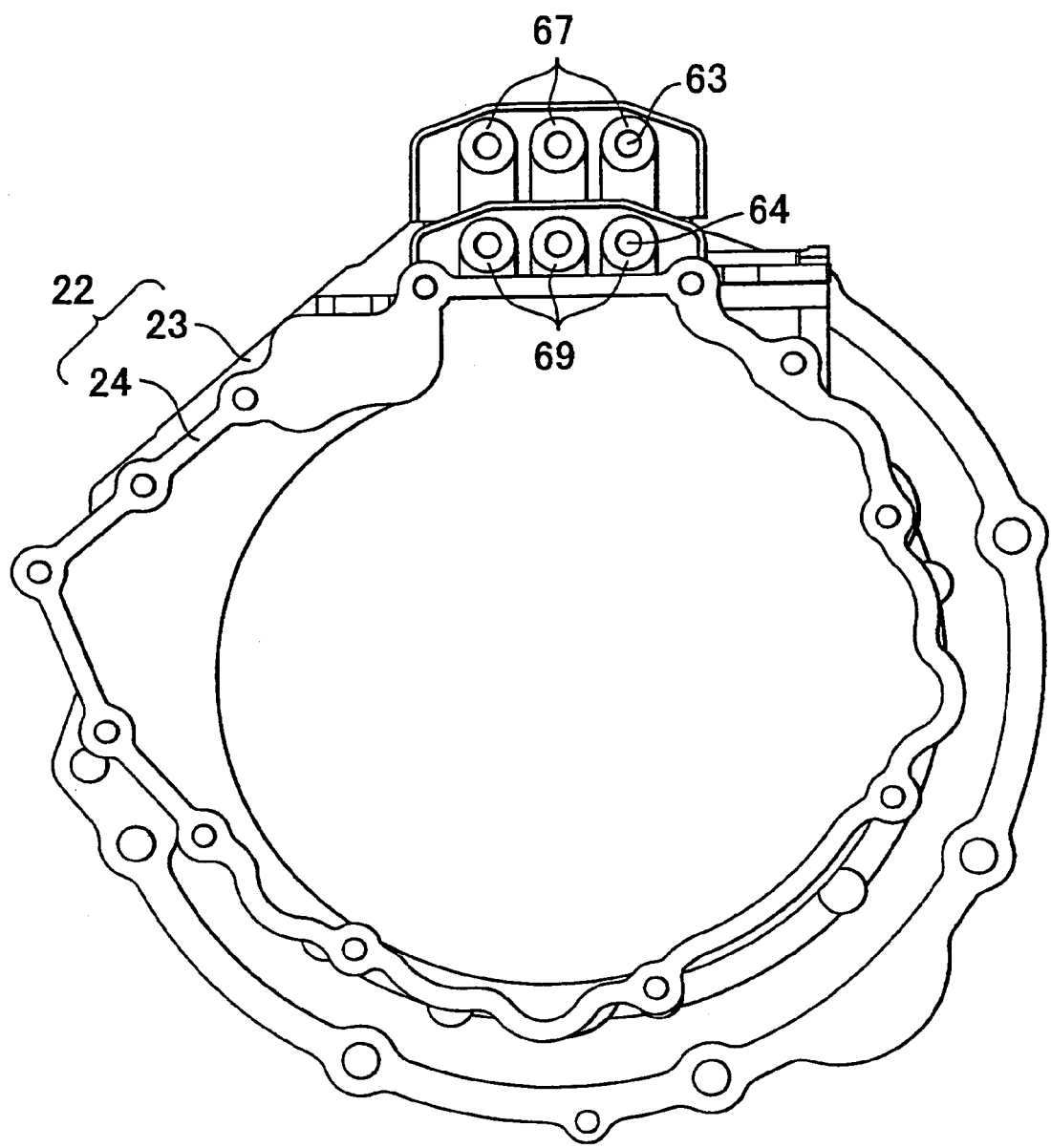
FIG. 3 is a side view of a core case of the drive apparatus as viewed from the output shaft side.

As shown in FIGS. 3 and 5, a first outlet 67 is mounted to the core case 22 on the driven wheels 13 side of the MG1. Then, the first connecting terminal 68 is fed through the first outlet 67 and led out of the core case 22. Also, a second outlet 69, similar to the first outlet 67, is mounted to the core case 22 on the driven wheels 13 side of the first outlet 67. Then, the second connecting terminal 71 is fed through the second outlet 69 and led out of the core case 22. The first outlet 67 and the second outlet 69 are formed curved away from the engine 12 and parallel to each other.

Further, as shown in FIG. 2, an oil pump 72 is provided to supply oil to sliding parts, e.g., between the input shaft 45 and the first rotor 33, and between the middle shaft 48 and the second rotor 41, and the like, in the drive case 21. From among the spaces between the MG1 and the MG2 in the core case 22, this oil pump 72 is provided in the space S2 below the power splitting mechanism portion 27, and is attached to the lower portion of the second cover 37. Also, an oil sump 73 is provided on the lower portion of the second case 24, and an oil strainer 74 that filters oil drawn in from the oil pump 72 is disposed within this oil sump 73.

The drive apparatus 14 of the construction described above operates as described below, for example, according to the running conditions of the hybrid vehicle 11.

<During Take off and Low Speed Running>

In a region where the rotation of the driven wheels 13 is slow and there is a high load on the engine, such that the engine efficiently is low, such as during take off and when running at low speeds, the engine 12 stops operating and power is supplied to the MG2 from the high voltage battery 62. The second rotor 41 of the MG2 rotates and that rotation is transmitted to the output shaft 49 via the sun gear 56, the pinion gear 59, and the ring gear 57 of the speed reducing mechanism portion 28. The rotation of the output shaft 49 is then transmitted to the driven wheels 13 through the propeller shaft 15 and the like. In this way, the driven wheels 13 are driven by only the power from the MG1. At this time, the first rotor 33 in the MG1 is idling.

<During Normal Running>

During normal running, the engine 12 is operated and power therefrom is transmitted to the driven wheels 13 after being split into two paths by the power splitting mechanism portion 27. One of the paths transmits the power input to the input shaft 45 to the pinion gear 55 and the ring gear 53. The power transmitted along this path is transmitted to the output shaft 49 via the middle shaft 48. The other path transmits power to the generator to drive it so as to generate electricity. More specifically, this path transmits the power input to the input shaft 45 to the first rotor 33 of the MG1 via the pinion gear 55 and the sun gear 52. The first rotor 33 is rotated and power is generated by the MG1 by this power transmission. The generated electric power is supplied to the MG2, which is then used as an auxiliary power source to the engine 12. That is, the second rotor 41 of the MG2 is rotated and that rotation is then transmitted to the output shaft 49 after being decelerated by the speed reducing mechanism portion 28. Then, the driven wheels 13 are driven by the power transmitted through both of these paths and ultimately output from the output shaft 49.

<During High Load>

Operation when running under a high load is the same as during normal running except that electric power is also supplied to the MG2 by the high voltage battery 62. As a result, the assist power provided by the MG2 is further increased.

<During Deceleration and Braking>

When decelerating and braking, the MG2 is driven by rotation of the driven wheels 13. In this case, the MG2 functions as a generator, regenerating electricity. Kinetic energy from decelerating the vehicle is converted into electrical energy and recovered (i.e., stored) in the high voltage battery 62.

The following effects are obtained from the exemplary embodiment described in detail above.

(1) In the drive apparatus 14, the MG1, the power splitting mechanism portion 27, the MG2, and the speed reducing mechanism portion 28 are arranged in-line in that order from the side near the engine 12 to the side away from the engine 12. Furthermore, the outside diameter of the MG2 is made smaller than the outside diameter of the MG1, the outside diameter of the power splitting mechanism portion 27 is made smaller than the outside diameter of the MG1 and the MG2, and the outside diameter of the speed reducing mechanism portion 28 is made smaller than the outside diameter of the MG2. As a result, the outside diameter of the drive apparatus 14 becomes increasingly smaller away from the engine 12. Also, the drive apparatus 14 has a conical shape and is compact. In this way, according to this exemplary embodiment, the speed reducing mechanism portion 28 is able to be incorporated into the drive apparatus 14 while the apparatus on the whole is able to be made compact.

Furthermore, the mountability in the hybrid vehicle 11 of this drive apparatus 14 that has been made compact in this way is excellent. In particular, the foregoing shape is substantially the same as the shape of a typical automatic transmission with a fluid type torque converter and a gear change mechanism, which is mounted in a conventional vehicle having an FR type drive system. Therefore, by designing the drive apparatus 14 so it that is substantially the same size as the automatic transmission, the drive apparatus 14 is able to be housed in the floor tunnel 19 that already exists in vehicles for housing an automatic transmission. Therefore, it is possible to arrange the drive apparatus 14, instead of the automatic transmission, in this floor tunnel 19. Phrased differently, the automatic transmission, as well as the drive apparatus 14, are able to be housed in an identical floor 18 that includes the floor tunnel 19, so the same floor 18 can be used. Therefore, it is not necessary to newly design a floor tunnel to house the drive apparatus 14 in addition to the existing floor tunnel that houses the automatic transmission.

(2) When expanding the use of the drive apparatus 14 to a wide variety of hybrid vehicles 11, if the specifications, such as those of the gear ratio of the speed reducing mechanism portion 28, can be conformed to the vehicle, the MG1, the MG2, and the power splitting mechanism portion 27 and the like can be used as they are as common parts.

Here, the third case 25 in which the speed reducing mechanism portion 28 is mounted is independent from the core case 22 in which the MG1, the MG2, and the power splitting mechanism portion 27 are mounted. These cases 22 and 25 can be joined to, and separated from, one another. As a result, by preparing a unit part in which the speed reducing mechanism portion 28 is mounted in the third case 25 for each type of hybrid vehicle 11, there only needs to be one type of unit (core unit) in which the MG1, the MG2, and the power splitting mechanism portion 27 are mounted in the core case 22, regardless of the type of the hybrid vehicle 11. Then, when assembling a plurality of kinds of the drive apparatuses 14 in an assembly plant or the like, the unit part in which the particular speed reducing mechanism portion 28 that matches the type of drive apparatus 14 is simply selected and attached to the common core unit. As a result, the work of changing to a different speed reducing mechanism portion 28 with a different gear ratio becomes easier.

(3) Because the power splitting mechanism portion 27 includes a planetary gear set, and the ring gear 53, which determines the overall size of that gear set, has a smaller outside diameter than the MG1 and the MG2, the space S1 and the space S2 are created toward the outside in the radial direction of the ring gear 53 between the MG1 and the MG2. Of these spaces, the space S1 is used as a space in which to house the first connecting portion 65 for electrically connecting the first cable 63 to the stator coil 36 of the MG1. In addition, the space S1 is also used as a space to house the second connecting portion 66 for electrically connecting the second cable 64 to the stator coil 44 of the MG1. By having both the first connecting portion 65 and the second connecting portion 66 in the space S1 between the MG1 and the MG2 in this way, space can be used efficiently. Further, the space S2 is used to house the oil pump 72, so space is used efficiently as well. Therefore, by using these spaces S1 and S2, the connecting portions 65 and 66 and the oil pump 72 can be housed without losing the compactness of the drive apparatus 14.

(4) The first connecting terminal 68 which is connected to the stator coil 36 of the MG1 is led out of the drive case 21 through the first outlet 67. The second connecting terminal 71 which is connected to the MG2 is also led out of the drive case 21 through the second outlet 69. Here, the first outlet 67 and the second outlet 69 are both provided in the drive case 21 which becomes increasingly narrow away from the engine 12. Also, the second outlet 69 is positioned on the side of the first outlet 67 opposite the engine 12, i.e., in a location having a smaller outside diameter than the first outlet 67 in the drive case 21. In addition, both the first outlet 67 and the second outlet 69 are curved away from the engine 12 and parallel to each other. As a result, in this exemplary embodiment in which the inverter 61, which is the connection mate of both of the cables 63 and 64, is arranged behind the drive apparatus 14 in the forward-backward direction of the vehicle, both the cables 63 and 64 can be led out of the drive case 21 together without interfering with one another and laid toward the inverter 61.

(5) It is also conceivable to provide a transmitting mechanism on the outside of the MG2 for transmitting rotation of the ring gear 53 of the power splitting mechanism portion 27 to the output shaft 49. In this case, for example, a shaft other than the input shaft 45 and the output shaft 49 is provided parallel to these shafts, and a rotation transmitting part such as a gear or the like is provided on each shaft. The shaft in this case corresponds to a counter shaft used in a manual transmission. As a result, rotation from the input shaft 45 is able to be transmitted to the output shaft 49 via the shaft (i.e., counter shaft), the gears or the like. On the other hand, because gears are used, there is a drawback of noise and vibration being generated when the gears mesh.

In contrast, according to this exemplary embodiment, the middle shaft 48 for transmitting rotation of the ring gear 53 to the output shaft 49 is integrally provided with the ring gear 53. Then this middle shaft 48 is inserted through the second rotor 41 of the MG2 and coupled to the ring gear 57 of the output shaft 49. This obviates the need for the aforementioned counter shaft. Because noise and vibration resulting from the meshing of gears is not generated, the noise and vibration characteristics are improved.

(6) The torque after speed reduction by the speed reducing mechanism portion 28 is larger than before speed reduction. Therefore, the parts that transmit the increased torque must be very strong. According to this exemplary embodiment, the output shaft 49 is larger in diameter than the input shaft 45 and the middle shaft 48 in order to meet this requirement.

Here, if the speed reducing mechanism portion 28 was arranged on the engine 12 side of the MG2, the output shaft 49, which is large in diameter, would be inserted through the MG2, thus requiring that the diameter of the MG2 be larger, which would increase the overall size of the drive apparatus 14. In contrast, according to this exemplary embodiment, the speed reducing mechanism portion 28 is arranged on the driven wheels 13 side of the MG2, as described above. As a result, the shaft (i.e., the middle shaft 48) that is inserted through the MG2 does not have to be of a large diameter, so an increase in size of the MG2 and the drive apparatus 14 is able to be avoided.

(7) Because the outside diameter of the MG2 is smaller than the outside diameter of the MG1, a space is created beneath the MG2. The oil sump 73 is incorporated into this space. As a result, an increase in size of the drive apparatus 14 due to the incorporation of the oil sump 73 is able to be kept to a minimum. In other words, the oil sump 73 is able to be provided without sacrificing the mountability of the drive apparatus 14.

(8) The first support wall 31 and the first cover 29 of the first case 23 rotatably support the first rotor 33, as well as form a closed space for housing the MG1 and the like. Also, the second support wall 38 and the second cover 37 of the second case 24 rotatably support the second rotor 41, as well as form a closed space for housing the MG2 and the like. It is therefore possible to suppress foreign matter from getting into the first housing portion 23b and the second housing portion 24b and causing poor operation with respect to rotation and the like of the first rotor 33 and the second rotor 41. As a result, the MG1 and the MG2 are able to maintain their functions as a motor or generator well, and are thus able to be highly reliable.

(9) The first cover 29 is arranged on the engine 12 side (i.e., on the end portion on the engine side of the first housing portion 23b) of the MG1 inside the first main portion 23a. The diameter of the first main portion 23a in this location is comparatively larger than the general outside diameter around the first main portion 23a. In particular, the diameter of the first main portion 23a in this location is definitely larger than the diameter of the first main portion 23a at a location corresponding to the end portion on the driven wheel side of the first housing portion 23b. The size relationship of the distance D1 between the inside surface of the first housing portion 23b and the inside surface of the first main portion 23a is the same as described above. Therefore, because the distance D1 is larger than the sum of the width w1 of the first flange 29a and the gap g1 between first flange 29a and the first main portion 23a, even if the first main portion 23a does not extend outward in the radial direction, the first cover 29 can still be arranged within the first main portion 23a and fastened to the first housing portion 23b by the first bolt 30.

In this way, it is possible to suppress the outside diameter of the first case 23 from becoming larger with the first cover 29 attached, and therefore maintain the original outer shape of the drive case 21, in which it becomes increasingly narrow away from the engine 12. This outer shape is similar to the outer shape of an automatic transmission provided with a torque converter and a gear change mechanism, which is housed in a vehicle having a FR type drive system. As a result, it is possible to arrange the drive apparatus 14, instead of the automatic transmission, in the floor tunnel 19, and improve mountability of the drive apparatus 14 in the vehicle.

(10) The diameter of the first main portion 23a increases closer to the engine 12. Therefore, even in the first main portion 23a, a sufficiently wide space is created around the first cover 29, and particularly around the first flange 29a, arranged near the engine 12. This space facilitates the operation of loosening and tightening the first bolt 30 when detaching and attaching the first cover 29.

(11) The second cover 37 is arranged on the engine 12 side (i.e., on the end portion on the engine side of the second housing portion 24b) of the MG2 within the second main portion 24a. The diameter of the second main portion 24a in this location is comparatively larger than the general outside diameter around the second main portion 24a. In particular, the diameter of the second main portion 24a in this location is definitely larger than the diameter of the second main portion 24a at a location corresponding to the end portion on the driven wheel side of the second housing portion 24b. The size relationship of the distance D2 between the inside surface of the second housing portion 24b and the inside surface of the second main portion 24a is the same as described above. Therefore, because the distance D2 is larger than the sum of the width w2 of the second flange 37a and the gap g2 between second flange 37a and the second main portion 24a, even if the second main portion 24a does not extend outward in the radial direction, the second cover 37 can be arranged within the second main portion 24a and fastened to the second housing portion 24b by the second bolt 40. In this way, it is possible to suppress the outside diameter of the second case 24 from becoming larger with the second cover 37 attached, and therefore maintain the original outer shape of the drive case 21, in which it becomes increasingly narrow away from the engine 12. Accordingly, together with the effect of (2) above, mountability of the drive apparatus 14 in the vehicle is further improved.

(12) The diameter of the second main portion 24a increases closer to the engine 12. Therefore, even in the second main portion 24a, a sufficiently wide space is created around the second cover 37, and particularly around the second flange 37a, arranged near the engine 12. This space facilitates the operation of loosening and tightening the second bolt 40 when detaching and attaching the second cover 37.

This invention can be implemented with other exemplary embodiments described as follows.

The MG1 and the MG2 may each also be able to perform both a regenerative operation and a powering operation, or either one of the two. Accordingly, a VR type (variable reluctance type) synchronous motor, a vernier motor, a direct current motor, an induction motor, a superconducting motor, a step motor, or the like may also be used instead of an alternating current synchronous motor of the type used in the foregoing exemplary embodiment.

The drive apparatus according to the invention is not limited to a FR type driving system, but may also be applied to a hybrid vehicle having another type of driving system such as a front engine front drive (FF) driving system.

In the foregoing exemplary embodiment, the planetary carrier 58 of the speed reducing mechanism portion 28 is fixed. Alternatively, however, the ring gear 57 may be fixed to the third case 25 or the like.

The second flange 37*a* may be formed over the entire circumference of the outer edge portion of the second cover 37, or only on a portion thereof.

The technical ideas that can be understood from these exemplary embodiments, as well as their effects, shall now be described.

(A) In the drive apparatus for a hybrid vehicle, the power splitting mechanism portion includes the planetary gear set which has a ring gear with an outer diameter smaller than the motor generator and which is arranged between the motor generators. The oil pump to supply oil to sliding parts is provided in a space that is outward in the radial direction from the ring gear between the motor generators.

According to the foregoing construction, the oil pump is able to be incorporated without losing the compactness of the drive apparatus by efficiently using the space between the two motor generators.

(B) In the drive apparatus for a hybrid vehicle according to aforementioned (A), the oil sump is further provided beneath the second motor generator.

According to this construction, an increase in size of the drive apparatus due to the arrangement of the oil sump is able to be kept to a minimum.

(C) In the drive apparatus for a hybrid vehicle, the first fastening member includes a first bolt that is inserted through the first flange and screwed into the first housing portion.

(D) In the drive apparatus for a hybrid vehicle, the first fastening member includes a first bolt that is inserted through the first flange and screwed into the first housing means.

According to (C) and (D), the first cover can be reliably fastened to the end portion on the engine side of the first housing portion by the first bolt.

(E) In the drive apparatus for a hybrid vehicle, the second fastening member includes the second bolt that is inserted through the second flange and screwed into the second housing portion.

(F) In the drive apparatus for a hybrid vehicle according, the second fastening member includes the second bolt that is inserted through the second flange and screwed into the second housing means.

According to (E) and (F), the second cover can be reliably fastened to the end portion on the engine side of the second housing portion by the second bolt.

(G) In the drive apparatus for a hybrid vehicle according aforementioned (C) to (F), the first housing portion has a cylindrical shape and is provided with a support wall on the end portion on the side opposite the engine. That support wall is on the side of the motor generator opposite the engine and closes off that end portion.

According to this construction, the support wall and the first cover close off both end portions of the first housing portion so as to suppress foreign matter from getting into the first housing portion and causing poor operation of the first motor generator.

(H) In the drive apparatus for a hybrid vehicle according the aforementioned (D) or (F), the second housing portion has a cylindrical shape and is provided with second support wall on the end portion on the side opposite the engine. That second support wall is on the side of the second motor generator opposite the engine and closes off that end portion.

According to this construction, the second support wall and the second cover close off both end portions of the second housing portion so as to suppress foreign matter from getting into the second housing portion and causing poor operation of the second motor generator.

What is claimed is:

1. A drive apparatus for a hybrid vehicle, comprising:
a first motor generator that functions as one of a motor and a generator;
a power splitting mechanism portion that divides power generated by an engine into power for the first motor generator and power for a driven wheel;
a second motor generator which is arranged on a side of the first motor generator opposite the engine, which functions as one of a motor and a generator, which generates power for driving the driven wheel that is different from the power from the engine, and which has an outside diameter smaller than an outside diameter of the first motor generator;
a speed reducing mechanism portion which is arranged on a side of the second motor generator opposite the engine, which has an outside diameter smaller than an outside diameter of the second motor generator, and which reduces a rotation speed of the second motor generator, wherein the drive apparatus is designed such that its outside diameter becomes increasingly small away from the engine;
a first connecting portion for electrically connecting a first cable to the first motor generator;
a second connecting portion for electrically connecting a second cable to the second motor generator;
a drive case in which are mounted the first motor generator and the second motor generator, and which has an outside shape that becomes increasingly narrow away from the engine;
a first outlet, which is formed in the drive case and which is formed curved away from the engine, and through which the first cable connected to the first motor generator is led out of the drive case; and
a second outlet, which is formed parallel to the first outlet in the drive case on a side of the first outlet opposite the engine, and through which the second cable connected to the second motor generator is led out of the drive case.

2. A drive apparatus for a hybrid vehicle comprising:
a first motor generator that functions as one of a motor and a generator;
a power splitting mechanism portion that divides power generated by an engine into power for the first motor generator and power for a driven wheel;
a second motor generator which is arranged on a side of the first motor generator opposite the engine, which functions as one of a motor and a generator, which generates power for driving the driven wheel that is different from the power from the engine, and which has an outside diameter smaller than an outside diameter of the first motor generator; and a speed reducing mechanism portion which is arranged on a side of the second motor generator opposite the engine, which has an outside diameter smaller than an outside diameter of the second motor generator, and which reduces a rotation speed of the second motor generator, a core case which has an outside shape that becomes increasingly narrow away from the engine and in which are mounted the first motor generator, the second motor generator, and the power splitting mechanism portion;

a case which is provided separate from the core case and in which is mounted the speed reducing mechanism portion;

a joining portion for joining the case to the core case;

a first connecting portion for electrically connecting a first cable to the first motor generator;

a second connecting portion for electrically connecting a second cable to the second motor generator;

a drive case in which are mounted the first motor generator and the second motor generator, and which has an outside shape that becomes increasingly narrow away from the engine;

a first outlet, which is formed in the drive case and which is formed curved away from the engine, and through which the first cable connected to the first motor generator is led out of the drive case; and a second outlet, which is formed parallel to the first outlet in the drive case on a side of the first outlet opposite the engine, and through which the second cable connected to the second motor generator is led out of the drive case.

3. A drive apparatus for a hybrid vehicle comprising:

a first motor generator that functions as one of a motor and a generator;

a power splitting mechanism portion that divides power generated by an engine into power for the first motor generator and power for a driven wheel;

a second motor generator which is arranged on a side of the first motor generator opposite the engine, which functions as one of a motor and a generator, which generates power for driving the driven wheel that is different from the power from the engine, and which has an outside diameter smaller than an outside diameter of the first motor generator;

a speed reducing mechanism portion which is arranged on a side of the second motor generator opposite the engine, which has an outside diameter smaller than an outside diameter of the second motor generator, and which reduces a rotation speed of the second motor generator, a first connecting portion for electrically connecting a first cable to the first motor generator;

a second connecting portion for electrically connecting a second cable to the second motor generator;

a drive case in which are mounted the first motor generator and the second motor generator, and which has an outside shape that becomes increasingly narrow away from the engine;

a first outlet, which is formed in the drive case and which is formed curved away from the engine, and through which the first cable connected to the first motor generator is led out of the drive case; and a second outlet, which is formed parallel to the first outlet in the drive case on a side of the first outlet opposite the engine, and through which the second cable connected to the second motor generator is led out of the drive case.

* * * * *